Aug. 20, 1946.  F. J. WIEGAND  2,406,181
FLOWMETER
Filed Jan. 14, 1943

INVENTOR
FRANCIS J. WIEGAND.
BY
ATTORNEY

Patented Aug. 20, 1946

2,406,181

UNITED STATES PATENT OFFICE 2,406,181

FLOWMETER

Francis J. Wiegand, Ridgewood, N. J., assignor to Wright Aeronautical Corporation, a corporation of New York Application January 14, 1943, Serial No. 472,409

3 Claims. (Cl. 121—41)

This invention relates to measuring apparatus and is particularly concerned with apparatus for transforming small pressure differentials into larger and more useful pressure differentials.

A typical application of this invention is for measuring small low rates of fluid flow by means of a venturi. In accordance with this invention, the small differential pressure produced by a low rate of fluid flow through a venturi is transformed into a larger pressure differential. Thus, the apparatus could be used for measuring fuel flow to an internal combustion engine. In the prior art, in order to transform a small pressure differential into a larger pressure differential, it is common practice to do so by using electric or pneumatic relays which control an external source of energy. It is an object of this invention to transform the small differential pressure to be measured into a larger pressure differential without the use of any external source of energy.

Specifically, this invention comprises a diaphragm system consisting of a relatively large diaphragm subjected to a pressure differential responsive to the condition to be measured and a second diaphragm mechanically connected to the first diaphragm for movement therewith. The mechanical connection between the diaphragms operates a valve for controlling the transmission of pressure from the high pressure side of the larger diaphragm to the high pressure side of the smaller diaphragm to balance the diaphragm system.

Other objects of this invention will become apparent in reading the annexed detailed description in connection with the drawing, in which.

Figure 1:
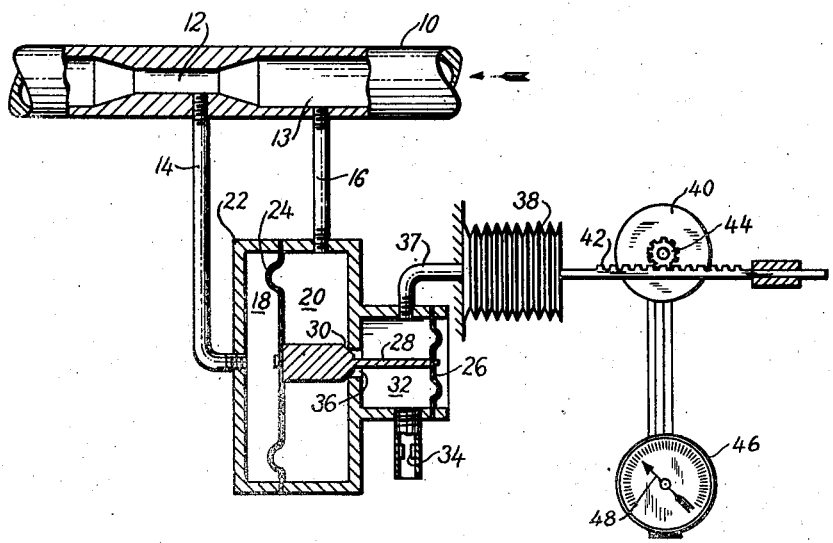
Fig. 1 is a diagrammatic view of the invention.

Referring to the drawing, a conduit 10 is provided with a Venturi throat 12 for metering the flow of the fluid through the conduit. Conduits 14 and 16 connect the Venturi throat 12 and barrel 13 with chambers 18 and 20, respectively. These chambers are formed within a housing 22 by a flexible diaphragm 24. Thus, the diaphragm 24 is urged to the left, as seen on the drawing, by a force proportional to the magnitude of the flow through conduit 10. A second diaphragm 26 is mechanically connected to the diaphragm 24 by a stem 28 provided with a poppet valve 30. This diaphragm 26 separates the chamber 32 from the atmosphere or other balance pressure and a restrictive outlet 34 provides a drain bleed for the chamber to the atmosphere or other vent pressure. The stem 28 passes through an opening 36 in the wall of chamber 20 and this opening forms a seat for the valve 30. The valve 30 thereby controls the transmission of pressure from chamber 20 to chamber 32. Accordingly, the diaphragm 26 is subjected to a force to the right, as seen in the drawing, to balance the force acting on diaphragm 24, the force acting on diaphragm 26 being equal to the pressure differential between the pressure in chamber 32 and atmospheric pressure or other balance pressure.

A small flow in the conduit 10 will subject the diaphragm 24 to a small force to the left to open the valve 30. Pressure will then be transmitted from chamber 20 to chamber 32 until the diaphragm 26 is subjected to a sufficient pressure differential to balance the pressure differential acting on diaphragm 24. Upon an increase in flow in conduit 10, the pressure differential on diaphragm 24 increases to further open the valve 30 until the pressure differential acting on the diaphragm 26 has increased sufficiently to again balance the system. Similarly, a decrease in flow through the conduit 10 results in a decrease in the pressure differential acting on the diaphragm 24 thereby moving the valve 30 in a closing direction. The bleed 34 in the chamber 32 then permits a reduction in the pressure in this chamber until the pressure differential acting on diaphragm 26 has been reduced sufficiently to again balance the diaphragm system. Thus, the valve 30 will assume a position to maintain the correct pressure in the chamber 32 to balance the diaphragm system.

When the diaphragm system is balanced, the pressure differential acting on the smaller diaphragm 26 is necessarily larger than the pressure differential acting on the larger diaphragm 24 in proportion to the ratio of the areas of these diaphragms. Therefore, since the pressure differential acting on the diaphragm 24 is a measure of the flow through the conduit 10, the larger and more useful pressure differential acting on the diaphragm 26 is also a measure of the flow through conduit 10. Accordingly, this larger pressure differential may be used to operate an indicator calibrated so as to indicate the flow in conduit 10.

At this point it should be noted that the relative size of the diaphragms must be correctly proportioned in view of the magnitude of the pressure differential acting on the diaphragm 24 and in view of the relative magnitude of these pressures as compared to the atmospheric pressure or other balance pressure to which the diaphragm is subjected. Thus, if the diaphragm 26 is too small or the pressure differential on the diaphragm 24 is too large, it will be impossible to develop sufficient pressure within the chamber 32 to balance the diaphragm system even though valve 30 is fully open. Also, with atmospheric pressure on one side of diaphragm 26 it is essential that the pressures on both sides of diaphragm 24 be greater than atmospheric pressure, otherwise it will be impossible to balance the diaphragm system. However, if the right side of the diaphragm 26 is subjected to other than atmospheric pressure, it is only necessary that the pressures acting on diaphragm 24 be greater than this other pressure. As previously stated, this invention may be used for measuring fuel flow to an internal combustion engine. In such case, a fuel pressure of 15 pounds per square inch is typical. However, this pressure is only mentioned by way of example and is not to be construed as limiting the use of the invention.

In Fig. 1 the amplified pressure differential acting on the diaphragm 26 is used for operating a remote Selsyn motor type indicator. The pressure from the chamber 32 is transmitted by a pipe 37 to a "Sylphon" bellows 38 so that this bellows is subjected to the same pressure differential per unit effective area as diaphragm 26. The bellows 38 is connected to the rotor of a Selsyn transmitter 40 by a rack 42 and a pinion 44. The Selsyn transmitter 40 is connected to a remote Selsyn receiver 46 in the conventional manner. Thus, the Selsyn receiver 46 is responsive to the pressure differential acting on the diaphragm 26 so that the rotor of the Selsyn receiver may drive an indicator 48 calibrated to read the flow in conduit 10.

Figure 2:
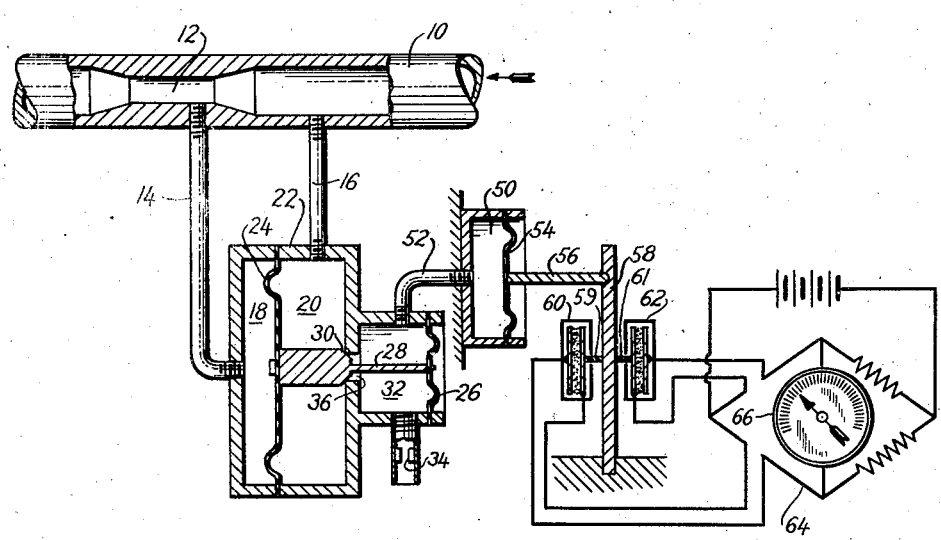
Fig. 2 is a diagrammatic view of a modification.

Fig. 2 is a modification of the system of Fig. 1 illustrating a different type of indicating means responsive to the differential pressure acting on the diaphragm 26. That portion of Fig. 2 similar to Fig. 1 has been designated by similar reference numerals and no further description of this portion of the apparatus is deemed necessary. In this modification the chamber 32 is connected to a chamber 50 by a conduit 52. A flexible diaphragm 54 separates this chamber from the atmosphere so that this diaphragm is subjected to the same pressure differential per unit area as that acting against diaphragm 26. A link arm 56 connects the diaphragm 54 to a flexible cantilever beam 58 so that the deflection of this beam is proportional to the pressure differential acting against diaphragms 26 and 54.

A pair of conventional granular carbon type resistances 60 and 62 are mounted on opposite sides of the beam 58 so that deflection of the beam is operative thru insulating arms 59 and 61 to increase one of these resistances and decrease the other resistance. These resistances form a pair of arms of a conventional Wheatstone bridge circuit 64. A galvanometer 66 or other indicator is connected across this bridge and may be calibrated to read the flow in conduit 10, since the deflection of beam 58 is proportional to the pressure differential acting against the diaphragm 26.

By providing a pair of resistances 60 and 62 oppositely responsive to the deflection of the beam 58 instead of just one resistance, the effect of ambient temperature surrounding the apparatus is eliminated. If the apparatus is being used to measure fuel flow to an internal combustion engine, elimination of the effect of ambient temperature is quite important because of the variation in temperature of the engine under different operating conditions.

The apparatus has been illustrated and described in connection with the pressure differential created by a fluid flowing through a venturi. However, the apparatus is of general application and can be used wherever amplification of a small pressure differential is desired.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In apparatus for transforming a small pressure differential into a larger pressure differential, the individual pressures of said small pressure differential both being greater than atmospheric pressure, a housing, a first movable member dividing said housing into a pair of opposed chambers, means for subjecting said member and chambers to said small pressure differential, the wall of the high pressure chamber removed from said member having an opening therethrough into a third chamber, a second movable member in said third chamber connected to said first member for joint movement therewith by means extending through said opening, said second member being of smaller effective area than said first member, a valve element formed on said connecting means for cooperation with said opening, the other side of said second member being subjected to atmospheric pressure, a restricted vent for said third chamber, and means responsive to the pressure differential across said second member.

2. Apparatus for transforming a small fluid pressure differential into a larger pressure differential comprising a housing, a first movable member dividing said housing into a pair of opposed chambers, means for subjecting said chambers and consequently said movable member to said small pressure differential, a third chamber separated from the high pressure chamber of said pair of chambers by a fixed partition, a second movable member of smaller effective area than said first member and disposed across said third chamber, means extending through an opening in said partition and connecting said members for joint movement, a valve element movable by said connecting means and cooperating with said opening for controlling the transmission of pressure from said high pressure chamber to said third chamber and consequently to one side of said second member, the opposite side of said second member being subjected to a pressure less than either of the individual pressures of said small pressure differential, said third chamber having a restricted fluid pressure leakage path therefrom, and means responsive to the pressure differential across said second member.

3. Apparatus for transforming a small pressure differential into a larger pressure differential comprising a housing, a first flexible diaphragm extending across said housing and dividing said housing into a pair of chambers, means for subjecting said chambers and consequently said flexible diaphragm to said small pressure differential, the individual pressures of said small pressure differential both being greater than atmospheric pressure, a third chamber in said housing and separated from the high pressure chamber of said pair of chambers by a fixed partition, a second flexible diaphragm of smaller effective area than said first diaphragm and extending across said third chamber, means extending through an opening in said partition and connecting said diaphragms for joint movement, a valve element movable by said connecting means and cooperating with said opening for controlling the transmission of pressure from said high pressure chamber to said third chamber and consequently to one side of said second flexible diaphragm, the other side of said second flexible diaphragm being subjected to atmospheric pressure, said third chamber having a restricted atmospheric vent, and a movable member responsive to the pressure differential across said second diaphragm.

FRANCIS J. WIEGAND.